A. C. TIMMING.
KNITTING MACHINE.
APPLICATION FILED AUG. 15, 1910.

1,017,705.

Patented Feb. 20, 1912.
7 SHEETS—SHEET 3.

Witnesses:
Hugo C. Oltsch
G. M. Cole

August C. Timming.
Inventor.
By George J. Oltsch.
Attorney

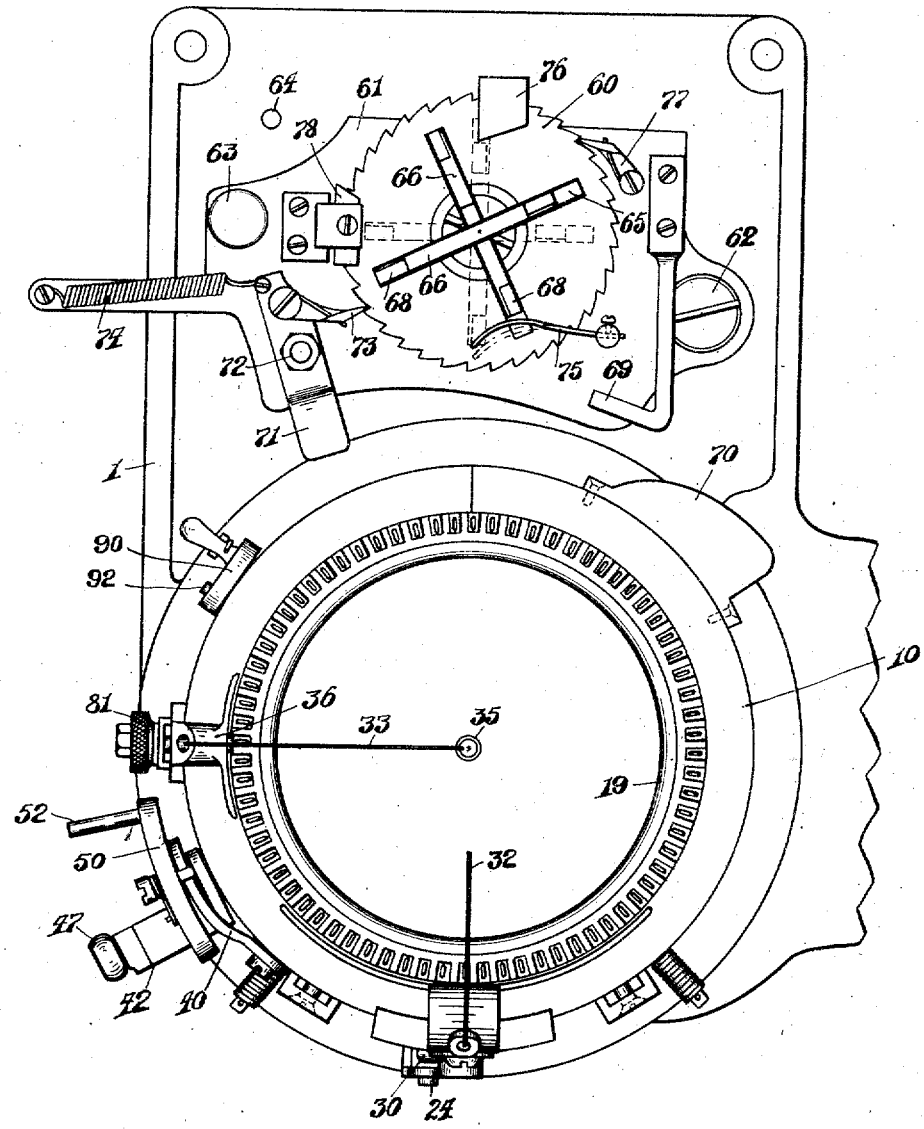

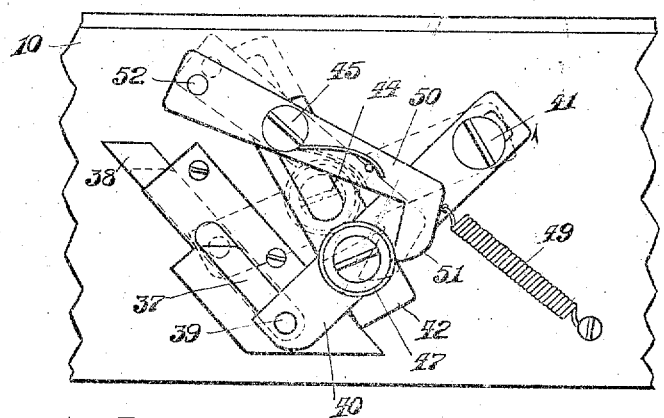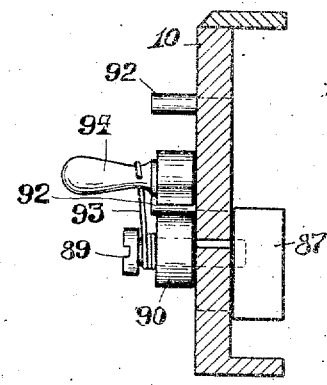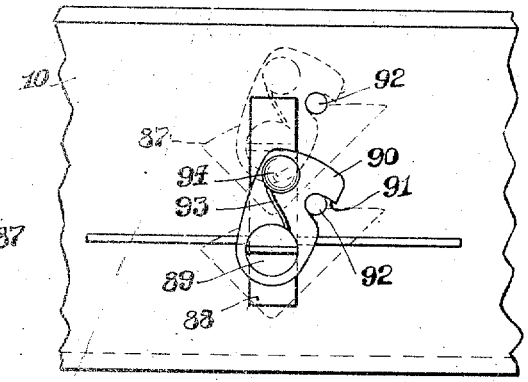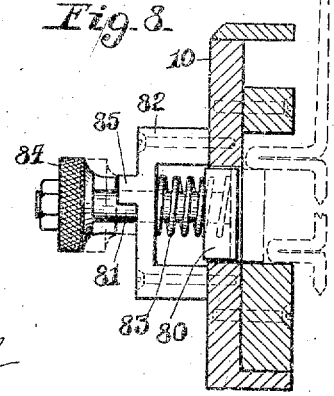

A. C. TIMMING.
KNITTING MACHINE.
APPLICATION FILED AUG. 15, 1910.

1,017,705.

Patented Feb. 20, 1912.
7 SHEETS—SHEET 6.

Witnesses:
Hugo B. Oltsch
G. W. Cole

August C. Timming
Inventor.
By George J. Oltsch
Attorney

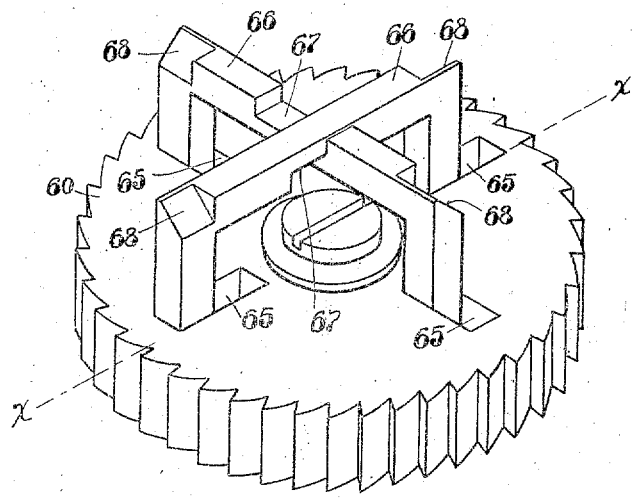
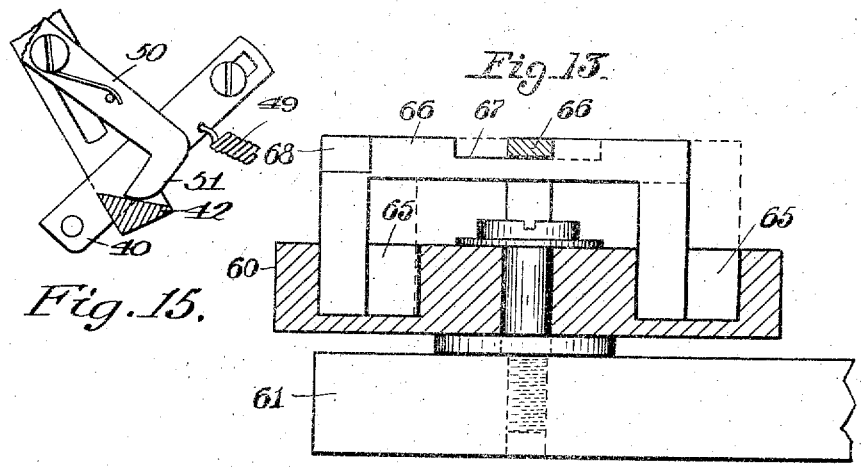

UNITED STATES PATENT OFFICE.

AUGUST C. TIMMING, OF SOUTH BEND, INDIANA, ASSIGNOR TO MISHAWAKA WOOLEN MANUFACTURING CO., OF MISHAWAKA, INDIANA, A CORPORATION OF INDIANA.

KNITTING-MACHINE 1,017,705.

Specification of Letters Patent.

Patented Feb. 20, 1912.

Application filed August 15, 1910. Serial No. 577,270.

*To all whom it may concern:*

Be it known that I, AUGUST C. TIMMING, a citizen of the United States, residing at South Bend, in the county of St. Joseph and State of Indiana, have invented certain new and useful Improvements in Knitting-Machines, of which the following is a specification.

My invention relates to improvements in circular knitting machines for knitting stockings or socks, and has for its object the structural simplification of such machines, so as to render the mechanism for carrying out the several functions thereof certain and positive in their operation, and to minimize the liability of the various parts to become out of order.

A further object of the invention resides in the novel arrangement and coöperation of mechanism for knitting the pattern and stripe in a sock, which is automatic in operation and which may be handily adjusted to vary the pattern and stripe.

With these and other objects in view, the invention consists in certain novel features of construction, as hereinafter described and pointed out in the claims.

Figure 1:
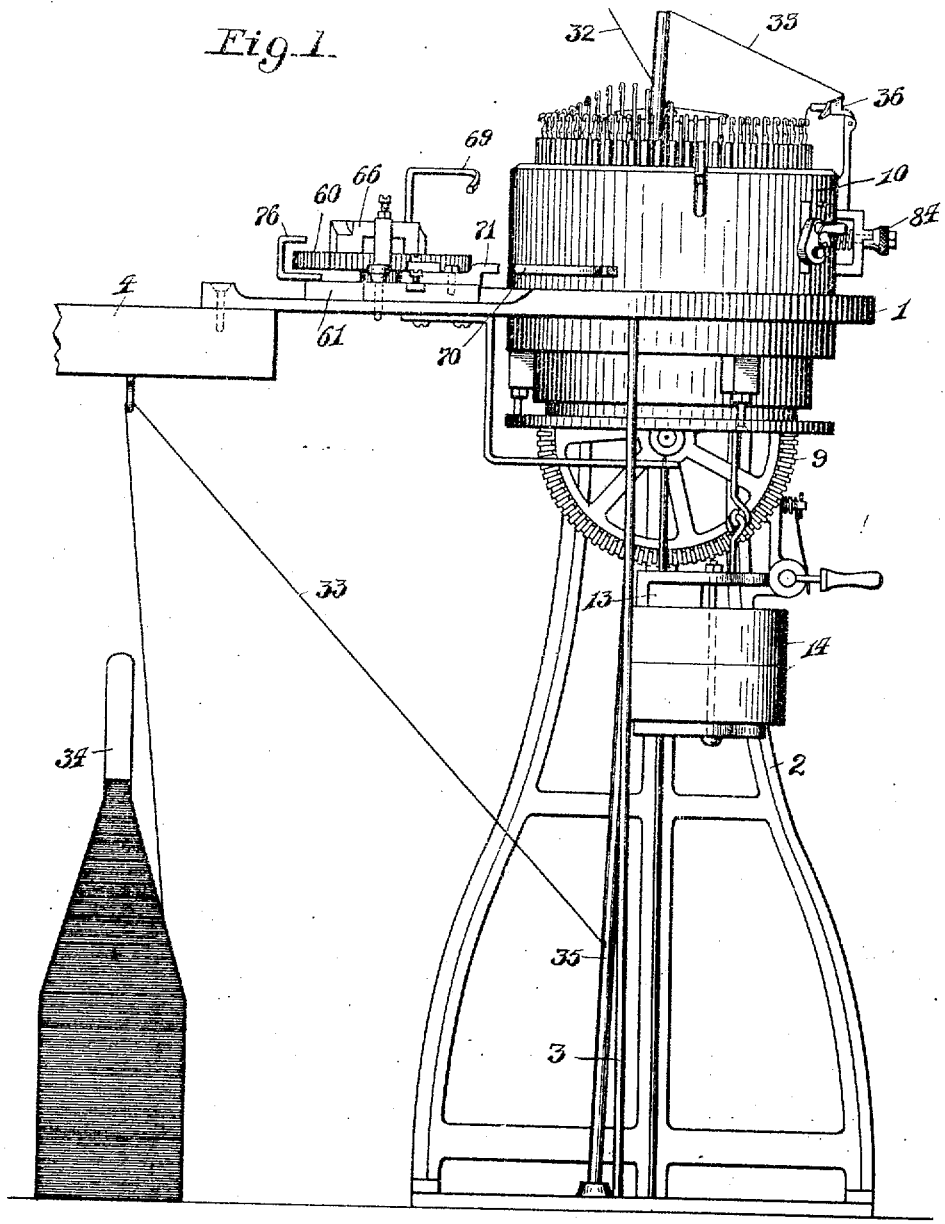
Figure 2:
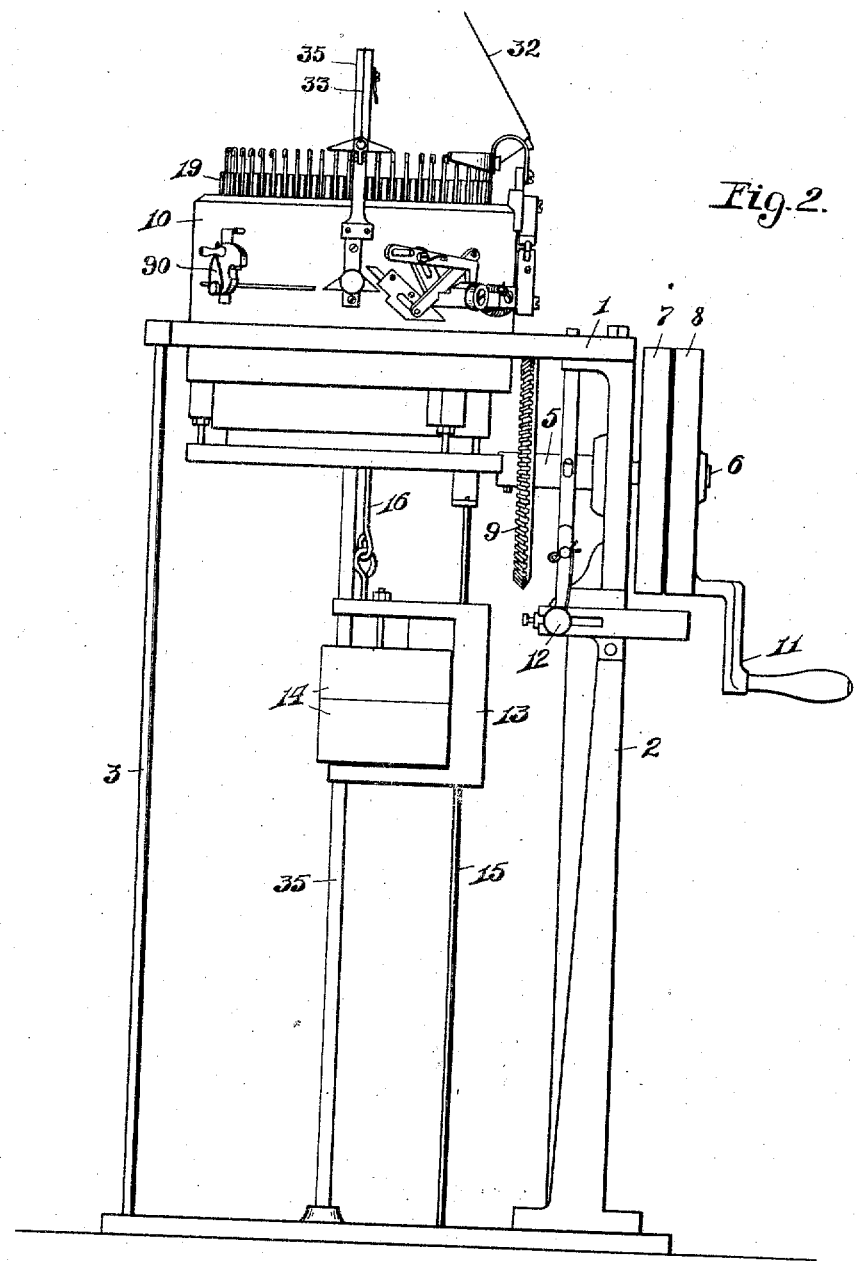
Figure 3:
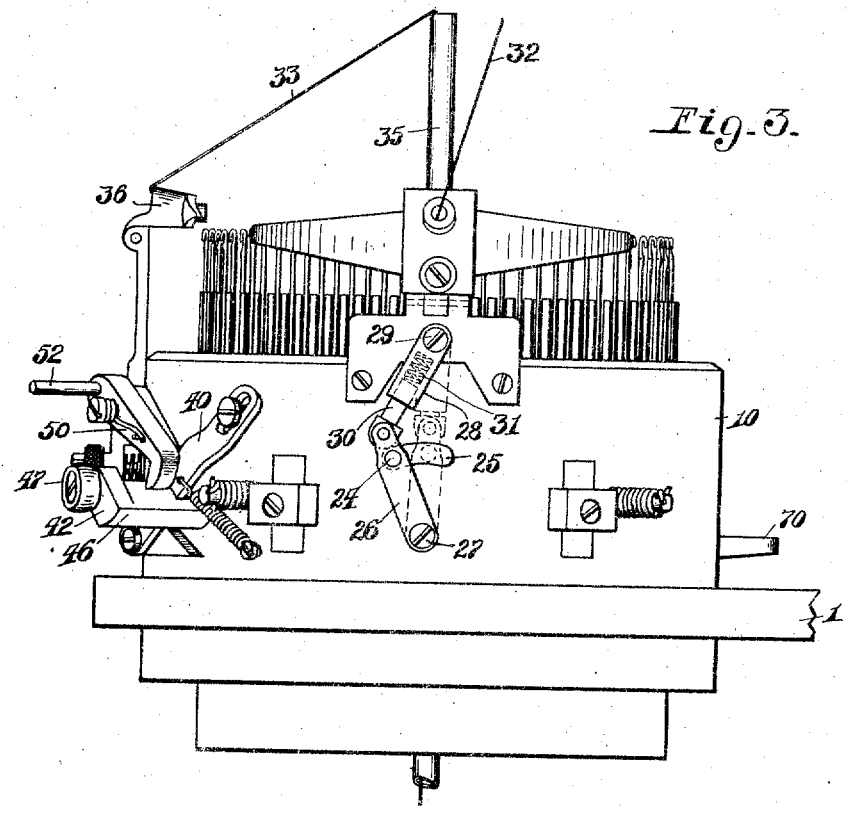
Figure 14:
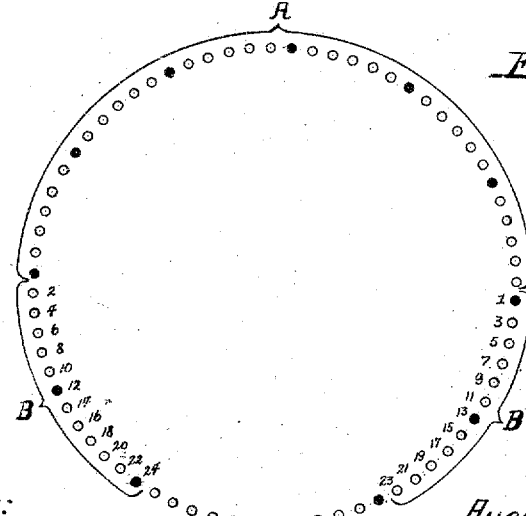

In the drawings employed for illustrating the preferred embodiment of the invention:—Figure 1 is a side view of the complete machine; Fig. 2 is a front view thereof; Fig. 3 is a side view on an enlarged scale of the cam and needle cylinders when viewed from the right hand side of the machine, with the cam cylinder in position shown in Fig. 2; Fig. 4 is a plan or top view of the machine; Fig. 5 is a detail view of the pattern cam actuating mechanism; Fig. 6 is a cross sectional view of the cam cylinder showing the stitch cam and adjusting block for the same; Fig. 7 is a side view of the stitch cam adjusting block; Fig. 8 is a cross sectional view of the cam cylinder showing the elevating cam for long heeled needles, and means for throwing same into and out of operative position; Fig. 9 is a side view of the internal structure of the cam cylinder developed on a plane, showing the relative position of the cams, and indicating by dot-and-dash lines the path followed by the needle heels for plain tubular knitting; Fig. 10 is a fragmentary view, developed on a plane, of the cam cylinder, showing the rocker cam for automatically and consecutively throwing the fashioning needles out of operation; Fig. 11 is a fragmentary view, developed on a plane, of the cam cylinder, showing the pattern cam, elevating cam for long heeled needles and the pattern stitch cam, the dot-and-dash line indicating the path traveled by both the long and short heeled needles in stitching the pattern; Fig. 12 is a perspective view of the pattern wheel and shifting dogs mounted thereon; Fig. 13 is a cross sectional view of the pattern wheel taken on a line $x$—$x$ of Fig. 12; Fig. 14 is a diagrammatic view in which the series of small circles represent the needles, the black solid circles representing long heeled and the plain circles short heeled needles. Fig. 15 is a detail sectional view of the shifting member forming a part of the pattern cam actuating mechanism.

For the purpose of clearness, the various steps in the operation of the machine will be described in detail and in the order in which the knitting of a sock proceeds from the start to the finish.

The machine embodies the bed plate 1, which is supported by the standard 2, and the rod or leg 3 in any suitable manner. The bed plate, for the purpose of holding the machine more secure and against vibration, may be fastened to a work bench 4, as shown. Suitably journaled in a bearing 5, supported by the standard, is a rotatable shaft 6, upon one end of which is mounted a loose pulley 7, and a drive pulley 8; and on its opposite end is mounted a bevel gear wheel 9, the teeth of which mesh with a bevel toothed flange (not shown) on the lower end of the cam cylinder 10. The drive pulley, which carries a crank handle 11, may be connected with any convenient line-shaft by a belt, for driving the machine by power; and a belt shifter 12 serves for throwing the machine into and out of operation.

The reference 13 represents a frame to support a weight or weights 14, and is slidably mounted for vertical movement upon a guide rod 15; a rod 16, which is hooked at one end being secured to the upper end of the frame, and its hooked end adapted to engage the web during the knitting operation and draw the same taut, for the purpose well understood in the art.

The parts thus far described are all of well known construction and operation, and as no claim is made thereto, it has not been deemed necessary to minutely describe the same.

The cam cylinder 10, is rotatably mounted in the bed plate, and is provided with the oppositely arranged fixed cams 17 and 18, the former of which serves as an elevating cam, and the latter as a stitch cam, when the cam cylinder is rotated from left to right for continuous tubular knitting. The dot-and-dash line in Fig. 9, represents the vertical movements of the needle heels as actuated by the cams and cam grooves in continuous tubular knitting, the needles being mounted in a stationary needle cylinder 19. The rock-cam 20, for the present purpose, remains stationary, and thus serves in conjunction with the cam 18, to depress the needles to effect the stitch movement, and the cam 17 elevating the needles. Thus for continuous tubular knitting the needles pass over the dropper cam 21, are elevated by the cam 17, and lowered to effect the stitch by the cams 20 and 18, the dropper cam 22 being raised by the needles as the heels thereof pass out of the cam groove, after which the needles remain in a stationary position until again actuated in the aforesaid manner.

Supposing now that the desired length of tubular fabric for the leg portion of the sock has been completed, and the next step is to form the heel. In forming the tubular fabric all of the needles are brought into action, but in fashioning the heel one-half of the needles are, while still retaining their stitch, raised by hand so that their heels will be above and free from the influence of the knitting cams, thus being entirely out of action during the fashioning operation. The needles thrown out of action are indicated within the bracket A in Fig. 14. The needles employed in making the heel, and which will hereinafter be referred to as the fashioning needles, usually consist of about one-third of the total number, which are equally divided and disposed at opposite sides of the needle cylinder, as represented by brackets B in Fig. 14. The fashioning needles are numbered consecutively in the order in which they are thrown out of action, upon reciprocation of the cam cylinder. The machine is not power driven during the fashioning of the heel and toe, the operator reciprocating the cam cylinder by means of the crank handle 11. For the purpose of throwing the fashioning needles automatically out of action one at a time, in order to narrow the flat web to the extent of one needle, at each movement of the cam cylinder as the same is reciprocated, the rocker cam 20 is disposed between the cams 17 and 18, its upper edge having an arc formation and extensions 23 which engage the notched upper ends of the last mentioned cams as the same is rocked from one to the other. A pin 24 on the rock cam projects through an arc-shaped slot 25 in the cam cylinder, and its end is attached to the lower arm 26 of a tension device for the rocker arm. The tension device comprises the lower arm 26, which is pivoted to the cam cylinder 27, and an upper arm 28, which is pivoted at 29, the pivotal points of the two arms being slightly out of vertical alinement, for a purpose presently explained. Pivotally connected with the upper end of the lower arm is a plunger 30, which enters a bore in the upper arm, with its free end engaging a coil spring 31, disposed within the bore, as plainly shown in Fig. 3. The tension device assumes either one or the other position shown in full and dotted lines, according as the rocker cam is rocked from one position to the other, and yieldingly holds the said cam against movement. In either position the free ends of the arms are over center, and the rocker cam is rocked against the action of the tension device.

The mode of operation in forming the heel is as follows: The operator, by means of the crank handle, causes the cam cylinder to be reciprocated, by giving the cylinder only a partial rotation in either direction. Assuming the first movement to be to the left, or in the direction of the arrow as shown in Fig. 10, the heel of needle marked No. 1 will contact with the rocker cam, and cause same to tilt into position shown by dotted lines, and in so doing elevate the needle out of range of the knitting cams 17 and 18, the remaining needles of the series being deflected by said cams to make the regulation stitch. On the reverse motion needle No. 2, of the opposite series, will be elevated out of action, thus continuing until all the fashioning needles are thrown out of action, so that with each reciprocating movement the flat web produced is narrowed to the extent of one needle. The action thus far is entirely automatic, and the operation in order to widen the web in order to complete the remaining half of the heel is effected in the same manner, except that the operator after each movement of the cam cylinder depresses two of the needles with his hand, so that while one needle is always automatically raised, one more needle comes into operation after each movement, until all of the needles are again within the influence of the knitting cams, and the gradual widening of the web is accomplished and the heel completed. The cylinder is now rotated and the tubular knitting continued to complete the foot portion of the sock. This completed, the same mode of operation for forming the heel is carried out for forming the toe.

Having now described the mechanism and mode of operation for knitting a plain sock, I will next proceed to described the mecha- nism and mode of operation for knitting a pattern or cross stripe around the sock, a double yarn feed being used, one for the body of the sock and the other for the pattern. The yarn used for the pattern is also used for knitting a stripe lengthwise of the sock. For the purpose of simplifying the description, the cross stripes will be hereinafter referred to as the "pattern", and the lengthwise stripes simply as the "stripe".

The pattern is formed by bringing all of the needles into action at the proper time, for example, every sixth revolution of the cam cylinder, depending upon the space desired between the patterns. The yarn 32 is for the body of the sock, and the pattern and stripe yarn 33, is conducted from the spool 34, through the tubular guide rod 35, to the yarn carrier 36. In order to automatically bring the pattern cam 37 into operative position at the proper intervals, which cam is arranged to slide and partly projects into a slanting slot 38 in the cam cylinder, the same is pivotally connected by means of a pivot screw 39, with the lower end of a swinging arm 40, which in turn is pivoted to the cylinder at 41, the pivot member passing through an elongated aperture in the arm, so as to permit the arm to have both a pivotal and longitudinal movement. The arm rests upon an L-shaped shifting member 42, one arm of which has a slot 44, through which a pivot screw 45 passes, and its laterally extending arm 46 has a friction roller 47 mounted on the end thereof. The slot 44 permits the shifting member to have an endwise movement, and a coil spring 49, one end of which is connected to the arm 40 and its opposite end to the cam cylinder, tends to draw the arm down and with it the shifting member, when the latter is not locked against movement. Mounted upon the pivot screw 45, is a spring actuated catch lever 50, the end 51 of which normally rests upon the beveled upper face of the shifting member, and its opposite end carries a laterally extending trip pin 52. Before describing the operation of the above mechanism for throwing the pattern cam into and out of operative position, it is advisable first to describe the means for actuating said mechanism at the desired intervals. For this purpose a pattern wheel is used which comprises a ratchet wheel 60, suitably mounted upon a plate 61, which latter is pivoted at 62 to the bed plate of the machine, so that the pattern wheel may be swung to one side and out of operative position, when plain knitting only is being done. The stay pin 63, is passed through corresponding apertures in the plate 61 and the bed plate, to retain same in either an operative or inoperative position. The pattern wheel and coöperating mechanism are shown in operative position in Fig. 4, and when moved to an inoperative position the stay pin 63 engages the aperture 64 in the bed plate. The ratchet wheel has grooves 65 formed in its upper side and arranged at right angles to each other, and in these grooves the leg members of arch-shaped tripping dogs 66 are adapted to slide. The cross members of the dogs are notched on the upper and lower side respectively, as indicated at 67 in Fig. 12, so as to bring the upper sides of the dogs on a level with each other. Each dog is beveled at its ends, as at 68, so that as each dog is shifted at the proper time and one of their ends brought within the path traveled by the friction roller 47, as the cam cylinder rotates, the roller will contact with the beveled portion and ride over the same, thus elevating the shifting member 42, and with it the bar 40 and the pattern cam connected therewith, thus bringing all of the needles into operation with respect to the pattern yarn. Upon elevation of the shifting member 42, the end of the catch lever 50 engages the under edge thereof and holds the same elevated until the cam cylinder has made a complete revolution and the pattern is stitched entirely around the sock, when the trip pin 52 on the catch lever engages the trip finger 69, and releases the pattern cam actuating mechanism, which thereupon assumes its normal position. If, as above stated, it is intended to stitch a pattern in the sock every sixth revolution of the cam cylinder, a cam 70, carried by said cylinder, is arranged to contact with the end of a ratchet dog 71, which rocks on a pivot 72, and carries a spring actuated pawl 73 on its opposite end to engage the ratchet wheel, the ratchet dog being returned to normal position after each movement by the spring 74. Upon each revolution of the cylinder the cam 70 rocks the ratchet dog sufficiently to move the ratchet wheel to the extent of two teeth, and the sixth movement brings the end of one of the trip dogs 66 into the path traveled by the friction roller. As the pattern wheel is revolved in a step by step motion, the ends of the trip dogs contact with a plate spring 75, which shifts the dogs out of the path of travel of the friction roller, and it is only when the predetermined time for the tripping operation arrives, that the end of a tripping dog engages a shift block 76, and shifts the same against the tension of the spring 75, into position for engagement by the friction roller, as shown by dotted lines in Fig. 4. As the end of the tripping dog passes the shifting block upon the next movement of the pattern wheel, the same is shifted out of operative position by the plate spring before the cam cylinder again completes a revolution. A detent 77 prevents reverse motion of the pattern wheel, and a friction block 78, preferably of leather, is held in contact with the upper surface of the pattern wheel to prevent lost motion.

The means and mode of operation for stitching a pattern will be readily understood from the foregoing description, and I will next proceed to describe the means and mode of operation for stitching a stripe lengthwise of the sock. For this purpose reference is to be had to Figs. 8 and 14, the former illustrating long and short heeled needles in dotted lines, and the latter a diagrammatical representation of the needles, in which the solid circles represent long heeled and the plain circles short heeled needles. The width between the stripes will depend upon the relative arrangement of the short and long heeled needles, the latter only stitching the stripe yarn. It is evident therefore that the stripe may be varied at will, by simply changing the relative positions of the long and short heeled needles. Both the short and long heeled needles are actuated by the proper cams for continuous tubular knitting, but the long heeled needles are actuated, so as to take the stripe yarn, only by projecting the striper cam 80 into the cam cylinder a sufficient distance so as to be engaged thereby, but not a sufficient distance so as to engage the short heeled needles, as plainly shown in Fig. 8. The striper cam is mounted to shift through an opening in the cam cylinder, and carries a pin 81, which extends through an aperture in the arch-block 82, with an expansion coil spring 83 encircling the same, and its ends bearing against the cam and the arch-block. Rotatably mounted upon the end of said pin is an adjusting knob 84, which has an inner face of step formation, and the arch-block is provided with a lug 85, so that by pulling outwardly on the knob and giving the same a half turn, the broadest part thereof will engage the lug, and thus hold the striper cam out of operative position. Another half turn will permit the protuberance on the knob to pass beside the lug and the cam to be shifted into operative position. When the striper cam is in use, the function of which is to elevate the long heeled needles only, a stitch cam 86 is lowered to effect a downward stroke of the needles and complete the stitch. Said stitch cam is secured to a block 87, which is arranged to slide in the slot 88 in the cam cylinder, and secured to said block by a pivot screw 89 is an adjusting head 90, having a notch 91 adapted to engage either of the pin stops 92, according as the head is in its raised or lowered position. A wire spring 93 coiled at one end around the pivot 89, and extending around the handle 94, serves to hold the head in engagement with the pin stops. By simply giving the adjusting head a slight turn so as to disengage same from the pin stop, the same may be raised or lowered and the stitch cam shifted into operative or inoperative position. The stitch cam is also shifted into operative position when stitching the pattern. The pattern and stripe yarn guide 36 is located directly over the striper cam, and over the upper end of the pattern cam when in an elevated position. It will be observed that, as every sixth needle, for example, has a long heel, they alone will be elevated to engage the stripe yarn; which, being of a different color than the body yarn, will stitch a stripe lengthwise of the sock, the intervening short heeled needles not being elevated by the striper cam, but serving only, in conjunction with the long heeled needles, to effect a continuous circular knitting with the body yarn.

When the heel and toe are being formed, or when continuous circular knitting is being done without any pattern or stripe, the pattern cam, striper cam and stitch cam which coöperates with said cams, are all maintained out of operative position; the pattern wheel, which controls the action of the pattern cam, being shifted into operative position only when it is desired to form a pattern or cross stripe, and the striper cam when it is desired to form a stripe lengthwise of the sock.

Having thus described my invention, what is claimed is:—

1. A pattern cam operating mechanism, comprising a rotative wheel, grooves formed in the upper side thereof, trip dogs arranged to slide in said grooves, a shift block for contacting with the ends of the trip dogs to shift the same in one direction, and means for shifting the trip dogs in the opposite direction.

2. A pattern cam operating mechanism, comprising a rotative wheel, radial grooves formed in the upper side thereof, arch-shaped trip dogs crossing each other and their leg members engaging said grooves, and means for shifting the trip dogs upon rotation of the wheel.

3. A pattern cam operating mechanism comprising a rotative pattern wheel, trip dogs mounted on said pattern wheel and slidable radially of the axis thereof, and means coöperating with the pattern wheel for alternately shifting the trip dogs toward and away from the periphery of said wheel.

4. In a pattern mechanism for knitting machines, the combination with the cam cylinder and pattern cam, actuating mechanism for the pattern cam, a pattern wheel having radially shiftable trip members mounted thereon, means on the cam cylinder coöperating with means for imparting intermittent motion to the pattern wheel, and means coöperating with the pattern wheel to alternately shift the trip members into and out of the path of the cam actuating mechanism.

5. In a pattern mechanism for knitting machines, the combination of the cam cylinder, a pattern cam arranged to slide thereon, a swinging arm pivoted on the cam cylinder and having its swinging end connected with the pattern cam, a shifting bar having a part thereof extending beneath said swinging arm for actuating the latter, a trigger mounted adjacent said shifting bar for locking engagement with the latter when in an elevated position, means for tripping the trigger, and mechanism operable by the cam cylinder for actuating the shifting bar at predetermined periods.

6. In a pattern mechanism for knitting machines, the combination of the cam cylinder, a pattern cam arranged to slide thereon, a swinging arm pivoted on the cam cylinder and having its swinging end connected with said pattern cam, a shifting bar having a longitudinal slot and a lateral extension extending beneath said swinging arm for actuating the latter, a pivot member on the cam cylinder extending through the slot in the shifting bar, a trigger mounted on said pivot member adjacent the shifting arm and adapted for locking engagement with the lateral extension of the shifting bar when in an elevated position, means for tripping said trigger, and mechanism for actuating the shifting bar at predetermined periods.

In testimony whereof I affix my signature, in presence of two witnesses.

AUGUST C. TIMMING.

Witnesses:
CHARLES G. HAGERTY,
GEORGE W. SANDS.